(12) United States Patent
Eckel et al.

(10) Patent No.: US 8,178,603 B2
(45) Date of Patent: May 15, 2012

(54) FLAMEPROOFED IMPACT-MODIFIED POLYCARBONATE COMPOSITIONS

(75) Inventors: Thomas Eckel, Dormagen (DE); Vera Taschner, Köln (DE); Achim Feldermann, Düsseldorf (DE); Eckhard Wenz, Köln (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 12/641,730

(22) Filed: Dec. 18, 2009

(65) Prior Publication Data
US 2011/0003918 A1 Jan. 6, 2011

(30) Foreign Application Priority Data
Dec. 23, 2008 (DE) .......................... 10 2008 062 903

(51) Int. Cl.
*C08K 5/523* (2006.01)
*C08K 5/5399* (2006.01)

(52) U.S. Cl. ........ 524/127; 524/138; 524/140; 524/141; 524/148

(58) Field of Classification Search .............. 524/127, 524/138, 140, 141, 148
See application file for complete search history.

(56) References Cited

U.S. PATENT DOCUMENTS

| | | | |
|---|---|---|---|
| 2,891,920 A | 6/1959 | Hyde et al. | |
| 3,294,725 A | 12/1966 | Findlay et al. | |
| 3,419,634 A | 12/1968 | Vaughn, Jr | |
| 3,553,167 A | 1/1971 | Schnell et al. | |
| 3,644,574 A | 2/1972 | Jackson et al. | |
| 4,075,173 A | 2/1978 | Maruyama et al. | |
| 4,269,964 A | 5/1981 | Freitag et al. | |
| 4,311,823 A | 1/1982 | Imai et al. | |
| 4,334,053 A | 6/1982 | Freitag et al. | |
| 4,584,360 A | 4/1986 | Paul et al. | |
| 4,806,593 A | 2/1989 | Kress et al. | |
| 4,877,831 A | 10/1989 | Hongo et al. | |
| 4,888,388 A | 12/1989 | Hongo et al. | |
| 5,723,526 A * | 3/1998 | Nagasawa ..................... | 524/451 |
| 6,492,467 B1 * | 12/2002 | Kim et al. ..................... | 525/316 |
| 6,528,561 B1 | 3/2003 | Zobel et al. | |
| 2002/0077417 A1 | 6/2002 | Itagaki | |
| 2009/0215934 A1 * | 8/2009 | Nakamura et al. ............ | 524/115 |
| 2010/0113660 A1 * | 5/2010 | Tomoda et al. ............... | 524/165 |

FOREIGN PATENT DOCUMENTS

| | | |
|---|---|---|
| DE | 3007934 | 9/1981 |
| DE | 3832396 | 2/1990 |
| EP | 0363608 | 4/1990 |
| EP | 0430134 | 6/1991 |
| EP | 0640655 | 3/1995 |
| EP | 0641827 | 3/1995 |
| GB | 1409275 | 10/1975 |
| GB | 1552558 | 9/1979 |
| JP | 07-316409 | 12/1995 |
| JP | 08-259791 | 10/1996 |
| JP | 2000-017136 | 1/2000 |
| JP | 2002-069282 | 3/2002 |
| WO | 0000541 | 1/2000 |
| WO | 0039210 | 7/2000 |
| WO | WO 2008/016157 * | 7/2008 |

* cited by examiner

*Primary Examiner* — Peter Szekely
(74) *Attorney, Agent, or Firm* — Baker Donelson Bearman Caldwell, & Berkowitz, P.C.

(57) ABSTRACT

The present disclosure relates to an impact-modified polycarbonate composition which comprise a first graft polymer containing silicone/acrylate composite rubber as the graft base, wherein the content of silicone rubber is 65-95 wt. % (based on the graft base), a second graft polymer containing a diene rubber, and phosphorus-containing flameproofing agent, the use of the polycarbonate compositions for the production of shaped articles and the shaped articles themselves. The compositions and molding compositions according to the disclosure have an optimum combination of good flameproofing at thin wall thicknesses, good resistance to chemicals and hydrolysis and low melt viscosity.

17 Claims, No Drawings

FLAMEPROOFED IMPACT-MODIFIED POLYCARBONATE COMPOSITIONS

CROSS REFERENCE TO RELATED APPLICATION

This application claims priority from DE 10 2008 062903 filed 23 Dec. 2008, the content of which is incorporated herein by reference, in its entirety.

BACKGROUND OF THE DISCLOSURE

1. Field of the Disclosure

The present disclosure relates to impact-modified polycarbonate compositions which comprise a first graft polymer containing silicone/acrylate composite rubber as the graft base, wherein the content of silicone rubber is 65-95 wt. % (based on the graft base), a second graft polymer containing a diene rubber, and phosphorus-containing flameproofing agent, the use of the polycarbonate compositions for the production of shaped articles and the shaped articles themselves.

2. Description of Related Art

US 2002/077417 A1 discloses flameproofed compositions comprising (a) polycarbonate, (b) graft polymer with a silicone/acrylate composite rubber, wherein the ratio of silicone to acrylate is 99:1 to 1:99, (c) optionally filler, such as, for example, talc, (d) phosphoric acid ester as a flameproofing agent, (e) optionally further additives, such as, for example, ABS, SAN and antidripping agents. Compositions comprising Metablen® S-2001, which is a graft polymer with a graft base of silicone/butyl acrylate composite rubber which comprises approx. 17 wt. % of methyl methacrylate, approx. 9 wt. % of organosiloxane and approx. 74 wt. % of butyl acrylate, are disclosed as examples. US 2002/077417 A1 does not disclose, however, compositions comprising a graft polymer with a silicone/acrylate composite rubber as the graft base, wherein the content of silicone rubber is 65-95 wt. % (based on the graft base).

JP-A 08-259791 discloses flameproofed compositions comprising polycarbonate and a silicone/acrylate rubber with 30-99% of siloxane.

JP-A 2000-017136 discloses compositions comprising polycarbonate, 1 to 40 wt. % of oligomeric phosphoric acid ester and graft polymer with a graft base of silicone/acrylate rubber, which contains 60-99 wt. % of polyorganosiloxane, optionally polytetrafluoroethylene and optionally talc.

JP-A 2002-069282 discloses compositions comprising polycarbonate, composite rubber (such as, for example, Metablen® SX-005), oligomeric phosphoric acid ester, silicone oil, optionally polytetrafluoroethylene and optionally additives.

WO-A 00/39210 discloses compositions comprising polycarbonate, copolymer, oligomeric phosphoric acid ester, graft polymer (for example Metablen S-2001) with a silicone/acrylate rubber as the graft base, wherein the content of polyorganosiloxane is greater than 50 wt. %, preferably greater than 70 wt. %, optionally polytetrafluoroethylene and a reinforcing substance, such as, for example, talc.

EP-A 0 641 827 discloses compositions comprising aromatic polycarbonate, graft polymer of vinyl monomer on diene rubber, phosphoric acid ester, polytetrafluoroethylene, inorganic filler, such as, for example, talc, and composite rubber of silicone rubber and acrylate rubber.

JP-A 07316409 discloses compositions comprising polycarbonate, phosphoric acid ester, graft polymer with a silicone/acrylate rubber as the graft base, wherein the content of polyorganosiloxane is 1-99 wt. % and the content of polyalkyl (meth)acrylate rubber is 99-1 wt. %.

However, the abovementioned documents do not disclose compositions comprising a second graft polymer with a diene rubber as the graft base.

SUMMARY OF THE DISCLOSURE

An object of the present disclosure was to provide flameproofed impact-modified polycarbonate moulding compositions having an optimum combination of good flameproofing at thin wall thicknesses, good resistance to chemicals and hydrolysis and low melt viscosity.

It has thus been found, surprisingly, that compositions comprising

A) 40 to 99 parts by wt., preferably 59 to 97 parts by wt., particularly preferably 70 to 90 parts by wt. (in each case based on the sum of the parts by weight of components A+B+C+D) of aromatic polycarbonate and/or aromatic polyester carbonate, B) 0.5 to 20 parts by wt., preferably 1 to 12 parts by wt., particularly preferably 2 to 8 parts by wt. (in each case based on the sum of the parts by weight of components A+B+C+D) of graft polymer, characterized in that the graft base is a silicone/acrylate composite rubber of mutually penetrating silicone rubber and polyalkyl (meth)acrylate rubber, wherein the content of silicone rubber is 65-95 wt. % (based on the graft base), C) 0.5 to 20 parts by wt., preferably 1 to 12 parts by wt., particularly preferably 2 to 8 parts by wt. (based on the sum of the parts by weight of components A+B+C+D) of graft polymer, characterized in that the graft base is a diene rubber, D) 0.4 to 20 parts by wt., preferably 4 to 17 parts by wt., particularly preferably 8 to 14 parts by wt. (in each case based on the sum of the parts by weight of components A+B+C+D) of flameproofing agent chosen from at least one of the group consisting of mono- and oligomeric phosphoric and phosphonic acid esters, phosphonatamines and phosphazenes, E) 0 to 20 parts by wt., preferably 0 to 6.5 parts by wt. (based on the sum of the parts by wt. of components A+B+C+D) of one or more polymers chosen from the group consisting of rubber-free vinyl(co)polymer and polyalkylene terephthalate, and particularly preferably the composition is free from rubber-free vinyl(co)polymer and polyalkylene terephthalate, F) 0 to 50 parts by wt., preferably 0.5 to 25 parts by wt. (in each case based on the sum of the parts by weight of components A+B+C+D) of additives, wherein all the parts by weight stated in the present application are standardized such that the sum of the parts by weight of components A+B+C+D in the composition is 100, achieve the abovementioned technical object.

Additional objects, features and advantages of the disclosure will be set forth in the description which follows, and in part, will be obvious from the description, or may be learned by practice of the disclosure. The objects, features and advantages of the disclosure may be realized and obtained by means of the instrumentalities and combination particularly pointed out in the appended claims.

DETAILED DESCRIPTION OF A PREFERRED EMBODIMENT

Component A

Aromatic polycarbonates and/or aromatic polyester carbonates according to component A which are suitable according to the disclosure are generally known from the literature and/or can be prepared by processes known from the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the preparation of aromatic polyester carbonates e.g. DE-A 3 077 934).

Aromatic polycarbonates can be prepared e.g. by reaction of diphenols with carbonic acid halides, preferably phosgene, and/or with aromatic dicarboxylic acid dihalides, preferably benzenedicarboxylic acid dihalides, by the interfacial process, optionally using chain terminators, for example monophenols, and optionally using branching agents which are trifunctional or more than trifunctional, for example triphenols or tetraphenols. A preparation via a melt polymerization process by reaction of diphenols with, for example, diphenyl carbonate is likewise possible.

Diphenols for the preparation of the aromatic polycarbonates and/or aromatic polyester carbonates are preferably those of the formula (I)

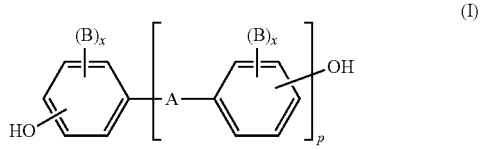

wherein

A is a single bond, $C_1$ to $C_5$-alkylene, $C_2$ to $C_5$-alkylidene, $C_5$ to $C_6$-cycloalkylidene, —O—, —SO—, —CO—, —S—, —SO$_2$—, $C_6$ to $C_{12}$-arylene, on to which further aromatic rings optionally containing hetero atoms can be fused, or a radical of the formula (II) or (III)

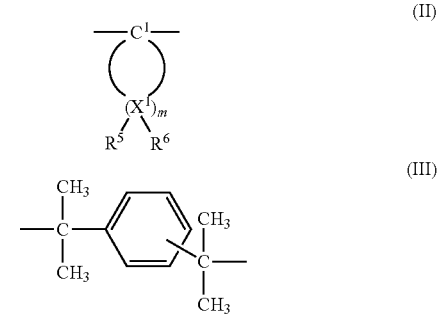

B is in each case $C_1$ to $C_{12}$-alkyl, preferably methyl, or halogen, preferably chlorine and/or bromine, x is in each case independently of one another 0, 1 or 2, P is 1 or 0, and $R^5$ and $R^6$ can be chosen individually for each $X^1$ and independently of one another denote hydrogen or $C_1$ to $C_6$-alkyl, preferably hydrogen, methyl or ethyl, $X^1$ denotes carbon and m denotes an integer from 4 to 7, preferably 4 or 5, with the proviso that on at least one atom $X^1$ $R^5$ and $R^6$ are simultaneously alkyl.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxy-phenyl) ethers, bis-(hydroxyphenyl) sulfoxides, bis-(hydroxyphenyl) ketones, bis-(hydroxyphenyl) sulfones and α,α-bis-(hydroxyphenyl)-diisopropyl-benzenes and derivatives thereof brominated on the nucleus and/or chlorinated on the nucleus.

Particularly preferred diphenols are 4,4'-dihydroxydiphenyl, bisphenol A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and di- and tetra-brominated or -chlorinated derivatives thereof, such as, for example, 2,2-bis(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. 2,2-Bis-(4-hydroxyphenyl)-propane (bisphenol A) is particularly preferred. The diphenols can be employed individually or as any desired mixtures. The diphenols are known from the literature and/or are obtainable by a process known from the literature.

Chain terminators which are suitable for the preparation of the thermoplastic aromatic polycarbonates are, for example, phenol, p-chlorophenol, p-tert-butylphenol or 2,4,6-tribromophenol, but also long-chain alkylphenols, such as 4-[2-(2,4,4-trimethylpentyl)]-phenol, 4-(1,3-tetramethylbutyl)-phenol according to DE-A 2 842 005 or monoalkylphenols or dialkylphenols having a total of 8 to 20 carbon atoms in the alkyl substituents, such as 3,5-di-tert-butylphenol, p-iso-octylphenol, p-tert-octylphenol, p-dodecylphenol and 2-(3,5-dimethylheptyl)-phenol and 4-(3,5-dimethylheptyl)-phenol. The amount of chain terminators to be employed is in general between 0.5 mol % and 10 mol %, based on the sum of the moles of the particular diphenols employed.

The thermoplastic aromatic polycarbonates have average weight-average molecular weights ($M_w$, measured e.g. by GPC, ultracentrifuge or scattered light measurement) of from 10,000 to 200,000 g/mol, preferably 15,000 to 80,000 g/mol, particularly preferably 24,000 to 32,000 g/mol.

The thermoplastic aromatic polycarbonates can be branched in a known manner, and in particular preferably by incorporation of from 0.05 to 2.0 mol %, based on the sum of the diphenols employed, of compounds which are trifunctional or more than trifunctional, for example those having three and more phenolic groups.

Both homopolycarbonates and copolycarbonates are suitable. 1 to 25 wt. %, preferably 2.5 to 25 wt. %, based on the total amount of diphenols to be employed, of polydiorganosiloxanes having hydroxyaryloxy end groups can also be employed for the preparation of the copolycarbonates according to the disclosure according to component A. These are known (U.S. Pat. No. 3,419,634) and can be prepared by a process known from the literature. The preparation of copolycarbonates containing polydiorganosiloxane is described, for example, in DE-A 3 334 782.

Preferred polycarbonates are, in addition to bisphenol A homopolycarbonates, copolycarbonates of bisphenol A with up to 15 mol %, based on the sum of the moles of diphenols, of other diphenols mentioned as preferred or particularly preferred, in particular 2,2-bis(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and of naphthalene-2,6-dicarboxylic acid. Mixtures of the diacid dichlorides of isophthalic acid and of terephthalic acid in a ratio of between 1:20 and 20:1 are particularly preferred.

A carbonic acid halide, preferably phosgene, is additionally co-used as a bifunctional acid derivative in the preparation of polyester carbonates.

Possible chain terminators for the preparation of the aromatic polyester carbonates are, in addition to the monophenols already mentioned, also chlorocarbonic acid esters thereof and the acid chlorides of aromatic monocarboxylic acids, which can optionally be substituted by $C_1$ to $C_{22}$-alkyl groups or by halogen atoms, and aliphatic $C_2$ to $C_{22}$-monocarboxylic acid chlorides.

The amount of chain terminators is in each case 0.1 to 10 mol %, based on the moles of diphenol in the case of the phenolic chain terminators and on the moles of dicarboxylic acid dichloride in the case of monocarboxylic acid chloride chain terminators.

The aromatic polyesters carbonates can also contain incorporated aromatic hydroxycarboxylic acids.

The aromatic polyester carbonates can be either linear or branched in a known manner (in this context see DE-A 2 940 024 and DE-A 3 007 934).

Branching agents which can be used are, for example, carboxylic acid chlorides which are trifunctional or more than trifunctional, such as trimesic acid trichloride, cyanuric acid trichloride, 3,3',4,4'-benzophenone-tetracarboxylic acid tetra-chloride, 1,4,5,8-naphthalenetetracarboxylic acid tetra-chloride or pyromellitic acid tetrachloride, in amounts of from 0.01 to 1.0 mol-% (based on the dicarboxylic acid dichlorides employed), or phenols which are trifunctional or more than trifunctional, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis-(4-hydroxyphenyl)-cyclohexyl]-propane, 2,4-bis-(4-hydroxyphenyl-isopropyl)-phenol, tetra-(4-hydroxyphenyl)-methane, 2,6-bis-(2-hydroxy-methyl-benzyl)-4-methylphenol, 2-(4-hydroxyphenyl)-2-(2,4-dihydroxyphenyl)-propane, tetra-(4-[4-hydroxyphenyl-isopropyl]-phenoxy)-methane or 1,4-bis-[4',4"-dihydroxytriphenyl)-methyl]-benzene, in amounts of from 0.01 to 1.0 mol %, based on the diphenols employed. Phenolic branching agents can be initially introduced with the diphenols, and acid chloride branching agents can be introduced together with the acid dichlorides.

The content of carbonate structural units in the thermoplastic aromatic polyester carbonates can vary as desired. The content of carbonate groups is preferably up to 100 mol %, in particular up to 80 mol %, particularly preferably up to 50 mol %, based on the sum of ester groups and carbonate groups. Both the ester and the carbonate content of the aromatic polyester carbonates can be present in the polycondensate in the form of blocks or in random distribution.

The relative solution viscosity ($\eta_{rel}$) of the aromatic polycarbonates and polyester carbonates is in the range of 1.18 to 1.4, preferably 1.20 to 1.32 (measured on solutions of 0.5 g of polycarbonate or polyester carbonate in 100 ml of methylene chloride solution at 25° C.).

The thermoplastic aromatic polycarbonates and polyester carbonates can be employed by themselves or in any desired mixture.

Component B

Component B preferably includes one or more graft polymers of

B.1 5 to 95 wt. %, preferably 10 to 90 wt. % of one or more vinyl monomers on

B.2 95 to 5 wt. %, preferably 90 to 10 wt. % of one or more silicone/acrylate composite rubbers as the graft base, wherein the silicone/acrylate rubber contains B.2.1 65-95 wt. % of silicone rubber and B.2.2 35 to 5 wt. % of polyalkyl(meth)acrylate rubber, wherein the two rubber components B.2.1 and B.2.2 mentioned are mutually penetrating in the composite rubber, so that they cannot be separated substantially from one another.

The graft copolymers B are prepared by free-radical polymerization, e.g. by emulsion, suspension, solution or bulk polymerization, preferably by emulsion or bulk polymerization.

Suitable monomers B.1 are vinyl monomers, such as vinylaromatics and/or vinylaromatics substituted on the nucleus (such as styrene, α-methylstyrene, p-methylstyrene and p-chlorostyrene), methacrylic acid ($C_1$-$C_8$-alkyl esters (such as methyl methacrylate, ethyl methacrylate, 2-ethylhexyl methacrylate and allyl methacrylate), acrylic acid ($C_1$-$C_8$-alkyl esters (such as methyl acrylate, ethyl acrylate, n-butyl acrylate and t-butyl acrylate), organic acids (such as acrylic acid and methacrylic acid) and/or vinyl cyanides (such as acrylonitrile and methacrylonitrile), and/or derivatives (such as anhydrides and imides) of unsaturated carboxylic acids (for example maleic anhydride and N-phenyl-maleimide). These vinyl monomers can be used by themselves or in mixtures of at least two monomers.

Preferred monomers B.1 are chosen from at least one of the monomers styrene, α-methylstyrene, methyl methacrylate, n-butyl acrylate and acrylonitrile. Methyl methacrylate is particularly preferably employed as the monomer B.1.

The glass transition temperature of the graft base B.2 is <10° C., preferably <0° C., particularly preferably <−20° C. The graft base B.2 in general has an average particle size ($d_{50}$ value) of from 0.05 to 10 μm, preferably 0.06 to 5 μm, particularly preferably 0.08 to 1 μm.

The average particle size $d_{50}$ is the diameter above and below which in each case 50 wt. % of the particles lie. It can be determined by means of ultracentrifuge measurement (W. Scholtan, H. Lange, Kolloid-Z. and Z. Polymere 250 (1972), 782-796).

According to the disclosure, silicone/acrylate rubbers of high silicone content are suitable as graft bases B.2. These silicone/acrylate rubbers are composite rubbers having grafting-active sites which contain a silicone rubber content of 65-95 wt. % and a polyalkyl(meth)acrylate rubber content of 35 to 5 wt. %, the two rubber components mentioned being mutually penetrating in the composite rubber, so that they cannot be separated substantially from one another.

Silicone/acrylate rubbers are known and are described, for example, in U.S. Pat. No. 5,807,914, EP 430134 and U.S. Pat. No. 4,888,388.

Suitable silicone rubber components of the silicone/acrylate rubbers are silicone rubbers having grafting-active sites, the preparation method of which is described, for example, in U.S. Pat. No. 2,891,920, U.S. Pat. No. 3,294,725, DE-OS 3 631 540, EP 249964, EP 430134 and U.S. Pat. No. 4,888,388.

The silicone rubber is preferably prepared by emulsion polymerization, in which siloxane monomer units, crosslinking or branching agents (IV) and optionally grafting agents (V) are employed.

Siloxane monomer units which are employed are, for example and preferably, dimethylsiloxane or cyclic organosiloxanes having at least 3 ring members, preferably 3 to 6 ring members, such as, for example and preferably, hexamethylcyclotrisiloxane, octamethylcyclotetrasiloxane, decamethylcyclopentasiloxane, dodecamethylcyclohexasiloxane, trimethyl-triphenyl-cyclotrisiloxanes, tetramethyl-tetraphenyl-cyclotetrasiloxanes and octaphenylcyclotetrasiloxane.

The organosiloxane monomers can be employed by themselves or in the form of mixtures with 2 or more monomers. The silicone rubber preferably contains not less than 50 wt. % and particularly preferably not less than 60 wt. % of organosiloxane, based on the total weight of the silicone rubber component.

Silane-based crosslinking agents having a functionality of 3 or 4, particularly preferably 4, are preferably used as crosslinking or branching agents (IV). There may be mentioned by way of example and preferably: trimethoxymethylsilane, triethoxyphenylsilane, tetramethoxysilane, tetraethoxysilane, tetra-n-propoxysilane and tetrabutoxysilane. The crosslinking agent can be employed by itself or in a mixture of two or more. Tetraethoxysilane is particularly preferred.

The crosslinking agent is employed in a range of amounts of between 0.1 and 40 wt. %, based on the total weight of the silicone rubber component. The amount of crosslinking agent is chosen such that the degree of swelling of the silicone rubber, measured in toluene, is between 3 and 30, preferably between 3 and 25 and particularly preferably between 3 and 15. The degree of swelling is defined as the weight ratio between the amount of toluene which is absorbed by the silicone rubber when it is saturated with toluene at 25° C. and the amount of silicone rubber in the dried state. The determination of the degree of swelling is described in detail in EP 249964.

If the degree of swelling is less than 3, i.e. if the content of crosslinking agent is too high, the silicone rubber does not show an adequate rubber elasticity. If the swelling index is greater than 30, the silicone rubber cannot form a domain structure in the matrix polymer and therefore also cannot improve the impact strength, and the effect would then be similar to simple addition of polydimethylsiloxane.

Tetrafunctional crosslinking agents are preferred over trifunctional, because the degree of swelling can then be controlled more easily within the limits described above.

Suitable grafting agents (V) are compounds which are capable of forming structures of the following formulae:

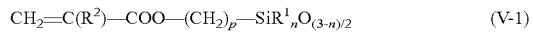
$$CH_2=C(R^2)-COO-(CH_2)_p-SiR^1{}_nO_{(3-n)/2} \quad (V-1)$$

$$CH_2=CH-SiR^1{}_nO_{(3-n)/2} \quad (V-2) \text{ or}$$

$$HS-(CH_2)_p-SiR^1{}_nO_{(3-n)/2} \quad (V-3),$$

wherein
$R^1$ represents $C_1$-$C_4$-alkyl, preferably methyl, ethyl or propyl, or phenyl,
$R^2$ represents hydrogen or methyl,
n denotes 0, 1 or 2 and
p denotes an integer from 1 to 6.

Acryloyl- or methacryloyloxysilanes are particularly suitable for forming the abovementioned structure (V-1) and have a high grafting efficiency. An effective formation of the graft chains is thereby ensured, and the impact strength of the resulting resin composition is therefore favoured.

There may be mentioned by way of example and preferably: β-methacryloyloxy-ethyldimethoxymethyl-silane, γ-methacryloyloxy-propylmethoxydimethyl-silane, γ-methacryloyloxy-propyldimethoxymethyl-silane, γ-methacryloyloxy-propyltrimethoxy-silane, γ-methacryloyloxy-propylethoxydiethyl-silane, γ-methacryloyloxy-propyldiethoxymethyl-silane, 5-methacryloyloxy-butyldiethoxymethyl-silanes or mixtures of these.

0 to 20 wt. % of grafting agent, based on the total weight of the silicone rubber, is preferably employed.

Suitable polyalkyl(meth)acrylate rubber components of the silicone/acrylate rubbers can be prepared from methacrylic acid alkyl esters and/or acrylic acid alkyl esters, a crosslinking agent (VI) and a grafting agent (VII). Preferred methacrylic acid alkyl esters and/or acrylic acid alkyl esters by way of example here are the $C_1$ to $C_8$-alkyl esters, for example methyl, ethyl, n-butyl, t-butyl, n-propyl, n-hexyl n-octyl, n-lauryl and 2-ethylhexyl esters; haloalkyl esters, preferably halo-$C_1$-$C_8$-alkyl esters, such as chloroethyl acrylate, and mixtures of these monomers. n-Butyl acrylate is particularly preferred.

Crosslinking agents (VI) which can be employed for the polyalkyl (meth)acrylate rubber component of the silicone/acrylate rubber are monomers having more than one polymerizable double bond. Preferred examples of crosslinking monomers are esters of unsaturated monocarboxylic acids having 3 to 8 C atoms and unsaturated monohydric alcohols having 3 to 12 C atoms, or of saturated polyols having 2 to 4 OH groups and 2 to 20 C atoms, such as ethylene glycol dimethacrylate propylene glycol dimethacrylate, 1,3-butylene glycol dimethacrylate and 1,4-butylene glycol dimethacrylate. The crosslinking agents can be used by themselves or in mixtures of at least two crosslinking agents.

Preferred grafting agents (VII) by way of example are allyl methacrylate, triallyl cyanurate, triallyl isocyanurate or mixtures thereof. Allyl methacrylate can also be employed as the crosslinking agent (VI). The grafting agents can be used by themselves or in mixtures of at least two grafting agents.

The amount of crosslinking agent (VI) and grafting agent (VII) is 0.1 to 20 wt. %, based on the total weight of the polyalkyl(meth)acrylate rubber component of the silicone/acrylate rubber.

The silicone/acrylate rubber is prepared by first preparing the silicone rubber as an aqueous latex. In this context, the silicone rubber can be prepared by emulsion polymerization, as described, for example, in U.S. Pat. No. 2,891,920 and U.S. Pat. No. 3,294,725. For this, a mixture containing organosiloxane, crosslinking agent and optionally grafting agent is mixed with water under the action of shearing forces, for example by a homogenizer, in the presence of an emulsifier based on a sulfonic acid, such as e.g. alkylbenzenesulfonic acid or alkylsulfonic acid, the mixture polymerizing to give the silicone rubber latex. An alkylbenzenesulfonic acid is particularly suitable, since it acts not only as an emulsifier but also as a polymerization initiator. In this case, a combination of the sulfonic acid with a metal salt of an alkylbenzenesulfonic acid or with a metal salt of an alkylsulfonic acid is favourable, because the polymer is thereby stabilized during the later grafting polymerization.

After the polymerization, the reaction is ended by neutralizing the reaction mixture by addition of an aqueous alkaline solution, e.g. by addition of an aqueous sodium hydroxide, potassium hydroxide or sodium carbonate solution.

This latex is then enriched with the methacrylic acid alkyl esters and/or acrylic acid alkyl esters to be used, the crosslinking agent (VI) and the grafting agent (VII), and a polymerization is carried out. An emulsion polymerization initiated by free radicals, for example by a peroxide initiator or an azo or redox initiator, is preferred. The use of a redox initiator system, specifically of a sulfoxylate initiator system prepared by combination of iron sulfate, disodium ethylenediaminetetraacetate, Rongalit and hydroperoxide, is particularly preferred.

The grafting agent (V) used in the preparation of the silicone rubber leads in this context to the polyalkyl(meth)acrylate rubber content being bonded covalently to the silicone rubber content. During the polymerization, the two rubber components penetrate each other and in this way form the composite rubber, which can no longer be separated into its constituents of silicone rubber component and polyalkyl (meth)acrylate rubber component after the polymerization.

For preparation of the silicone/acrylate graft rubbers B, the monomers B.1 are grafted on to the rubber base B.2.

In this context, the polymerization methods described, for example, in EP 249964, EP 430134 and U.S. Pat. No. 4,888,388 can be used.

For example, the grafting polymerization is carried out by the following polymerization method: The desired vinyl monomers B.1 are polymerized on to the graft base, which is in the form of an aqueous latex, in a one- or multistage emulsion polymerization initiated by free radicals. The grafting efficiency in this context should be as high as possible and is preferably greater than or equal to 10%. The grafting efficiency depends decisively on the grafting agents (V) and (VII) used. After the polymerization to give the silicone/acrylate graft rubber, the aqueous latex is introduced into hot water, in which metal salts, such as e.g. calcium chloride or magnesium sulfate, have been dissolved beforehand. The silicone/acrylate graft rubber coagulates during this procedure and can than be separated.

Component C

Graft polymers according to component C include in particular one or more graft polymers of C.1 5 to 95 wt. % of at least one vinyl monomer on C.2 95 to 5 wt. % of at least one graft base containing diene rubber.

Monomers C.1 are preferably mixtures of

C.1.1 50 to 99 parts by wt. (based on the sum of C.1.1 and C.1.2, equal to 100 parts by wt.) of vinylaromatics and/or vinylaromatics substituted on the nucleus (such as styrene, α-methylstyrene, p-methylstyrene and p-chlorostyrene) and/or (meth)acrylic acid ($C_1$-$C_8$)-alkyl esters, such as methyl methacrylate and ethyl methacrylate, and C.1.2 1 to 50 parts by wt. (based on the sum of C.1.1 and C.1.2, equal to 100 parts by wt.) of vinyl cyanides (unsaturated nitriles, such as acrylonitrile and methacrylonitrile) and/or (meth)acrylic acid ($C_1$-$C_8$)-alkyl esters, such as methyl methacrylate, n-butyl acrylate and t-butyl acrylate, and/or derivatives (such as anhydrides and imides) of unsaturated carboxylic acids, for example maleic anhydride and N-phenyl-maleimide.

The graft base C.2 in general has an average particle size ($d_{50}$ value) of from 0.05 to 10 μm, preferably 0.1 to 5 μm, particularly preferably 0.2 to 1 μm.

Preferred monomers C.1.1 are chosen from at least one of the monomers styrene, α-methylstyrene and methyl methacrylate, and preferred monomers C.1.2 are chosen from at least one of the monomers acrylonitrile, maleic anhydride and methyl methacrylate. Particularly preferred monomers are C.1.1 styrene and C.1.2 acrylonitrile.

Preferred graft bases C.2 are diene rubbers chosen from at least one diene rubber of the group consisting of butadiene rubber, isoprene rubber, copolymers of diene rubbers, copolymers of butadiene rubber and further copolymerizable monomers (e.g. according to C.1.1 and C.1.2) and copolymers of isoprene rubber and further copolymerizable monomers (e.g. according to C.1.1 and C.1.2). The graft bases C.2 in general have a glass transition temperature of <10° C., preferably <0° C., particularly preferably <−10° C., wherein the glass transition temperature is determined e.g. by DSC pursuant DIN EN 61006.

Particularly preferred graft polymers C are, for example, ABS polymers (emulsion, bulk and suspension ABS) such as are described e.g. in DE-OS 2 035 390 (=U.S. Pat. No. 3,644,574) or in DE-OS 2 248 242 (=GB 1 409 275) and in Ullmanns, Enzyklopädie der Technischen Chemie, vol. 19 (1980), p. 280 et seq. The gel content of the graft base C.2 is at least 20 wt. %, in the case of graft bases C.2 prepared in emulsion polymerization preferably at least 40 wt. % (measured in toluene).

Preferably, the graft polymer of components C.1 and C.2 has a core-shell structure, wherein component C.1 forms the shell (also called casing) and component C.2 forms the core (see e.g. Ullmann's Encyclopedia of Industrial Chemistry, VCH-Verlag, vol. A21, 1992, page 635 and page 656).

The graft polymers C are prepared by free-radical polymerization, e.g. by emulsion, suspension, solution or bulk polymerization, preferably by emulsion or bulk polymerization.

In a preferred embodiment, the graft polymer according to component C) is a graft polymer prepared in the emulsion polymerization process which contains a graft base C.2. having an average particles size ($d_{50}$ value) of from 0.15 to 0.4 μm, preferably 0.2 to 0.4 μm, particularly preferably 0.25 to 0.35 μm. Graft polymers which are prepared in the emulsion polymerization process by redox initiation with an initiator system of organic hydroperoxide and ascorbic acid in accordance with U.S. Pat. No. 4,937,285 are particularly suitable.

Since as is known the grafting monomers are not necessarily grafted completely on to the graft base during the grafting reaction, according to the disclosure graft polymers C are also understood as meaning those products which are produced by (co)polymerization of the grafting monomers in the presence of the graft base and are also obtained during the working up.

In a further preferred embodiment, the graft polymer according to component C is a graft polymer which is prepared in the bulk, solution or bulk-suspension polymerization process and has a rubber content (corresponds to the content of component C.2 in the graft polymer C) of from 16 to 25 wt. %, preferably from 17 to 19 wt. %, and a grafted shell which contains, in each case based on the monomers of the grafted shell, 22 to 27 wt. % of at least one of the monomers according to C.1.2 and 73 to 78 wt. % of at least one of the monomers according to C.1.1. The graft polymer most preferably contains a butadiene/styrene block copolymer rubber as the graft base C.2 (core) and a shell of styrene (C.1.1) and acrylonitrile (C.1.2). The graft polymer has a gel content (measured in acetone) of from 20 to 30 wt. %, preferably from 22 to 26 wt. %. If the graft polymer according to the disclosure contains a rubber content of less than 16 wt. %, this may have the disadvantage that the mechanical properties, in particular the notched impact strength, and the resistance to chemicals are at a level which could be inadequate for many uses.

The gel content of the graft base C.2 is determined at 25° C. in a suitable solvent (M. Hoffmann, H. Krömer, R. Kuhn, Polymeranalytik I und II, Georg Thieme-Verlag, Stuttgart 1977).

The average particle size $d_{50}$ is the diameter above and below which in each case 50 wt. % of the particles lie. It can be determined by means of ultracentrifuge measurement (W. Scholtan, H. Lange, Kolloid, Z. und Z. Polymere 250 (1972), 782-796).

Component D

Phosphorus-containing compounds are employed as the flameproofing agent according to component D. These are preferably chosen from the groups of mono- and oligomeric phosphoric and phosphonic acid esters, phosphonatamines and phosphazenes, it also being possible to employ mixtures of several components chosen from one or various of these groups as the flameproofing agent. Other halogen-free phosphorus compounds not mentioned specifically here can also be employed by themselves or in any desired combination with other halogen-free phosphorus compounds.

Preferred mono- and oligomeric phosphoric or phosphonic acid esters are phosphorus compounds of the general formula (VIII)

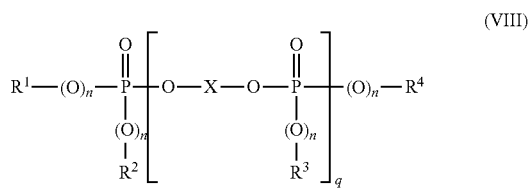

wherein $R^1, R^2, R^3$ and $R^4$ independently of one another denote in each case optionally halogenated $C_1$ to $C_8$-alkyl, or $C_5$ to $C_6$-cycloalkyl, $C_6$ to $C_{20}$-aryl or $C_7$ to $C_{12}$-aralkyl in each case optionally substituted by alkyl, preferably $C_1$ to $C_4$-alkyl, and/or halogen, preferably chlorine or bromine, n independently of one another denotes 0 or 1, q denotes 0 to 30 and X denotes a mono- or polynuclear aromatic radical having 6 to 30 C atoms, or a linear or branched aliphatic radical having 2 to 30 C atoms, which can be substituted by OH and can contain up to 8 ether bonds.

Preferably, $R^1, R^2, R^3$ and $R^4$ independently of one another represent $C_1$ to $C_4$-alkyl, phenyl, naphthyl or phenyl-$C_1$-$C_4$-alkyl. The aromatic groups $R^1, R^2, R^3$ and $R^4$ can in their turn be substituted by halogen groups and/or alkyl groups, preferably chorine, bromine and/or $C_1$ to $C_4$-alkyl. Particularly preferred aryl radicals are cresyl, phenyl, xylenyl, propylphenyl or butylphenyl and the corresponding brominated and chlorinated derivatives thereof.

X in the formula (VIII) preferably denotes a mono- or polynuclear aromatic radical having 6 to 30 C atoms. This is preferably derived from diphenols of the formula (I).

n in the formula (VIII) can be, independently of one another, 0 or 1, and preferably n is 1.

q represents values from 0 to 30, preferably 0.3 to 20, particularly preferably 0.5 to 10, in particular 0.5 to 6, very particularly preferably 1.05 to 1.6, most preferably 1.05 to 1.2.

X particularly preferably represents

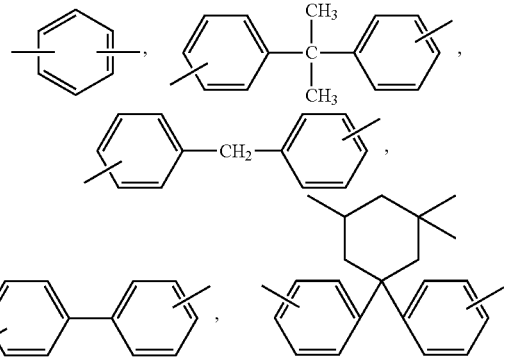

or chlorinated or brominated derivatives thereof, and in particular X is derived from resorcinol, hydroquinone, bisphenol A or diphenylphenol. Particularly preferably, X is derived from bisphenol A.

Mixtures of various phosphates can also be employed as component D according to the disclosure.

Phosphorus compounds of the formula (VIII) are, in particular, tributyl phosphate, triphenyl phosphate, tricresyl phosphate, diphenyl cresyl phosphate, diphenyl octyl phosphate, diphenyl 2-ethylcresyl phosphate, tri-(isopropylphenyl) phosphate, resorcinol-bridged oligophosphate and bisphenol A-bridged oligophosphate. The use of oligomeric phosphoric acid esters of the formula (VIII) which are derived from bisphenol A is particularly preferred.

Bisphenol A-based oligophosphate according to formula (VIIIa)

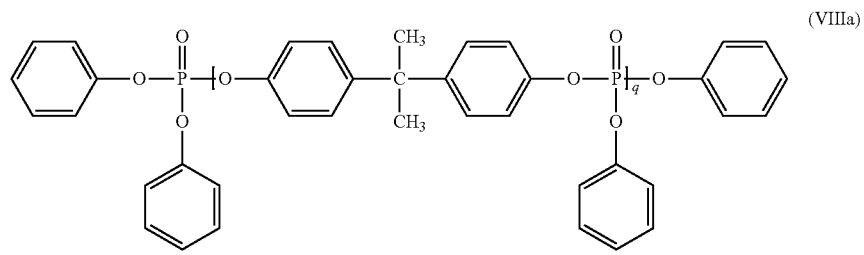

wherein q in formula (VIIIa) represents values from 1.05 to 1.2
are most preferred as component D.

The phosphorus compounds according to component D are known (cf. e.g. EP-A 0 363 608, EP-A 0 640 655) or can be prepared in an analogous manner by known methods (e.g. Ullmann Enzyklopädie der technischen Chemie, vol. 18, p. 301 et seq. 1979; Houben-Weyl, Methoden der organischen Chemie, vol. 12/1, p. 43; Beilstein vol. 6, p. 177).

If mixtures of various phosphorus compounds are employed, and preferably in the case of oligomeric phosphorus compounds, the q value stated is the average q value. The average q value can be determined by determining the composition of the phosphorus compound (molecular weight distribution) by means of a suitable method (gas chromatography (GC), high pressure liquid chromatography (HPLC), gel permeation chromatography (GPC)) and calculating the mean values for q therefrom.

Phosphonatamines and phosphazenes such as are described in WO-A 00/00541 and WO-A 01/18105 can furthermore be employed as flameproofing agents.

The flameproofing agents can be employed by themselves or in any desired mixture with one another or in a mixture with other flameproofing agents.

Component E

Component E includes one or more thermoplastic vinyl (co)polymers E.1 and/or polyalkylene terephthalates E.2.

Suitable vinyl(co)polymers E.1 are polymers of at least one monomer from the group of vinylaromatics, vinyl cyanides (unsaturated nitriles), (meth)acrylic acid ($C_1$-$C_8$)-alkyl esters, unsaturated carboxylic acids and derivatives (such as anhydrides and imides) of unsaturated carboxylic acids. (Co)polymers which are suitable in particular are those of E.1.1 50 to 99, preferably 60 to 80 parts by wt. of vinylaromatics and/or vinylaromatics substituted on the nucleus, such as styrene, α-methylstyrene, p-methylstyrene and p-chlorostyrene, and/or (meth)acrylic acid ($C_1$-$C_8$)-alkyl esters, such as methyl methacrylate and ethyl methacrylate, and E.1.2 1 to 50, preferably 20 to 40 parts by wt. of vinyl cyanides (unsaturated nitriles), such as acrylonitrile and methacrylonitrile, and/or (meth)acrylic acid ($C_1$-$C_8$)-alkyl esters, such as methyl methacrylate, n-butyl acrylate and t-butyl acrylate, and/or unsaturated carboxylic acids, such as maleic acid, and/or derivatives, such as anhydrides and imides, of unsaturated carboxylic acids, for example maleic anhydride and N-phenylmaleimide.

The vinyl(co)polymers E.1 are advantageously resinous, thermoplastic and rubber-free. The copolymer of E.1.1 styrene and E.1.2 acrylonitrile is particularly preferred.

The (co)polymers according to E.1 are generally known and can be prepared, for example, by free-radical polymerization, in particular by emulsion, suspension, solution or bulk polymerization. The (co)polymers preferably have average molecular weights Mw (weight-average, determined by light scattering or sedimentation) of between 15,000 and 200,000.

The polyalkylene terephthalates of component E.2 are reaction products of aromatic dicarboxylic acids or their reactive derivatives, such as dimethyl esters or anhydrides, and aliphatic, cycloaliphatic or araliphatic diols, and mixtures of these reaction products.

Preferred polyalkylene terephthalates contain at least 80 wt. %, preferably at least 90 wt. %, based on the dicarboxylic acid component, of terephthalic acid radicals and at least 80 wt. %, preferably at least 90 wt. %, based on the diol component, of radicals of ethylene glycol and/or butane-1,4-diol.

The preferred polyalkylene terephthalates can contain, in addition to terephthalic acid radicals, up to 20 mol %, preferably up to 10 mol % of radicals of other aromatic or cycloaliphatic dicarboxylic acids having 8 to 14 C atoms or aliphatic dicarboxylic acids having 4 to 12 C atoms, such as e.g. radicals of phthalic acid, isophthalic acid, naphthalene-2,6-dicarboxylic acid, 4,4'-diphenyldicarboxylic acid, succinic acid, adipic acid, sebacic acid, azelaic acid and cyclohexanediacetic acid.

The preferred polyalkylene terephthalates can contain, in addition to radicals of ethylene glycol or propane-1,3-diol or butane-1,4-diol, up to 20 mol % of other aliphatic diols having 3 to 12 C atoms or cycloaliphatic diols having 6 to 21 C atoms, e.g. radicals of 1,3-propanediol, 2-ethylpropane-1,3-diol, neopentyl glycol, 1,5-pentanediol, 1,6-hexanediol, cyclohexane-1,4-dimethanol, 3-methylpentane-2,4-diol, 2-methylpentane-2,4-diol, 2,2,4-trimethylpentane-1,3-diol and 2-ethylhexane-1,6-diol, 2,2-diethylpropane-1,3-diol, 2,5-hexanediol, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(3-β-hydroxyethoxyphenyl)-propane and 2,2-bis-(4-hydroxypropoxyphenyl)-propane (DE-A 24 07 674, 24 07 776 and 27 15 932).

The polyalkylene terephthalates can be branched by incorporation of relatively small amounts of 3- or 4-hydric alcohols or 3- or 4-basic carboxylic acids, e.g. in accordance with DE-A 1 900 270 and U.S. Pat. No. 3,692,744. Examples of preferred branching agents are trimesic acid, trimellitic acid, trimethylolethane and -propane and pentaerythritol.

Polyalkylene terephthalates which have been prepared solely from terephthalic acid and reactive derivatives thereof (e.g. dialkyl esters thereof) and ethylene glycol and/or butane-1,4-diol and mixtures of these polyalkylene terephthalates are particularly preferred.

Mixtures of polyalkylene terephthalates contain 1 to 50 wt. %, preferably 1 to 30 wt. % of polyethylene terephthalate and 50 to 99 wt. %, preferably 70 to 99 wt. % of polybutylene terephthalate.

The polyalkylene terephthalates preferably used in general have a limiting viscosity of from 0.4 to 1.5 dl/g, preferably 0.5 to 1.2 dl/g, measured in phenol/o-dichlorobenzene (1:1 parts by weight) at 25° C. in an Ubbelohde viscometer.

The polyalkylene terephthalates can be prepared by known methods (see e.g. Kunststoff-Handbuch, volume VIII, p. 695 et seq., Carl-Hanser-Verlag, Munich 1973).

Component F

The composition can comprise further commercially available additives according to component F, such as flameproofing synergists, antidripping agents (for example compounds of the substance classes of fluorinated polyolefins, of silicones and aramid fibres), lubricants and mould release agents (for example pentaerythritol tetrastearate), nucleating agents, stabilizers, antistatics (for example conductive carbon blacks, carbon fibres, carbon nanotubes and organic antistatics, such as polyalkylene ethers, alkylsulfonates or polyamide-containing polymers), acids, fillers and reinforcing substances (for example glass fibres or carbon fibres, mica, kaolin, talc, $CaCO_3$ and glass flakes) and dyestuffs and pigments.

Preparation of the Moulding Compositions and Shaped Articles

The thermoplastic moulding compositions according to the disclosure can be prepared by mixing the particular constituents in a known manner and subjecting the mixture to melt compounding and melt extrusion at temperatures of from 240° C. to 300° C. in conventional units, such as internal kneaders, extruders and twin-screw extruders.

The mixing of the individual constituents can be carried out in a known manner either successively or simultaneously, and in particular either at about 20° C. (room temperature) or at a higher temperature.

The disclosure likewise provides processes for the preparation of the moulding compositions and the use of the moulding compositions for the production of shaped articles and the mouldings themselves.

The moulding compositions according to the disclosure can be used for the production of all types of shaped articles. These can be produced by injection moulding, extrusion and blow moulding processes. A further form of processing is the production of shaped articles by thermoforming from previously produced sheets or films.

Examples of such shaped articles are films, profiles, housing components of all types, e.g. for domestic appliances, such as televisions, juice presses, coffee machines and mixers; for office machines, such as monitors, flat screens, notebooks, printers and copiers; sheets, tubes, electrical installation conduits, windows, doors and further profiles for the building sector (interior finishing and exterior uses) and electrical and electronic components, such as switches, plugs and sockets, and vehicle body or interior components for utility vehicles, in particular for the automobile sector.

The moulding compositions according to the disclosure can also be used in particular, for example, for the production of the following shaped articles or mouldings: interior finishing components for rail vehicles, ships, aircraft, buses and other motor vehicles, housing of electrical equipment containing small transformers, housing for equipment for processing and transmission of information, housing and lining of medical equipment, massage equipment and housing therefor, toy vehicles for children, planar wall elements, housing for safety equipment and for televisions, thermally insulated transportation containers, mouldings for sanitary and bath fittings, cover grids for ventilator openings and housing for garden equipment.

The following examples serve to explain the disclosure further.

EXAMPLES

Component A

Unbranched polycarbonate based on bisphenol A having a relative solution viscosity of $\eta_{rel}=1.28$, measured in $CH_2Cl_2$ as the solvent at 25° C. and a concentration of 0.5 g/100 ml.

Component B-1

Impact modifier, graft polymer of
B-1.1 11 wt. % of methyl methacrylate on

B-1.2 89 wt. % of a silicone/acrylate composite rubber as the graft base, wherein the silicone/acrylate rubber contains
   B-1.2.1 92 wt. % of silicone rubber and
   B-1.2.2 8 wt. % of polyalkyl(meth)acrylate rubber, and
wherein the two rubber components B.2.1 and B.2.2 mentioned are mutually penetrating in the composite rubber, so that they cannot be separated substantially from one another.

Component B-2

Impact modifier, graft polymer of
B-2.1 17 wt. % of methyl methacrylate on
B-2.2 83 wt. % of a silicone/acrylate composite rubber as the graft base, wherein the silicone/acrylate rubber contains B-2.2.1 11 wt. % of silicone rubber and
   B-2.2.2 89 wt. % of polyalkyl(meth)acrylate rubber, and
wherein the two rubber components B.2.1 and B.2.2 mentioned are mutually penetrating in the composite rubber, so that they cannot be separated substantially from one another.

Component C-1

ABS polymer prepared by bulk polymerization of 82 wt. %, based on the ABS polymer, of a mixture of 24 wt. % of acrylonitrile and 76 wt. % of styrene in the presence of 18 wt. %, based on the ABS polymer, of a polybutadiene/styrene block copolymer rubber having a styrene content of 26 wt. %. The weight-average molecular weight $M_w$ of the free SAN copolymer content in the ABS polymer is 80,000 g/mol (measured by GPC in THF). The gel content of the ABS polymer is 24 wt. % (measured in acetone).

Component C-2

ABS graft polymer with a core-shell structure prepared by emulsion polymerization of 43 wt. %, based on the ABS polymer, of a mixture of 27 wt. % of acrylonitrile and 73 wt. % of styrene in the presence of 57 wt. %, based on the ABS polymer, of a polybutadiene rubber crosslinked in particle form (average particle diameter $d_{50}=0.35$ μm).

Component D

Oligophosphate based on bisphenol A

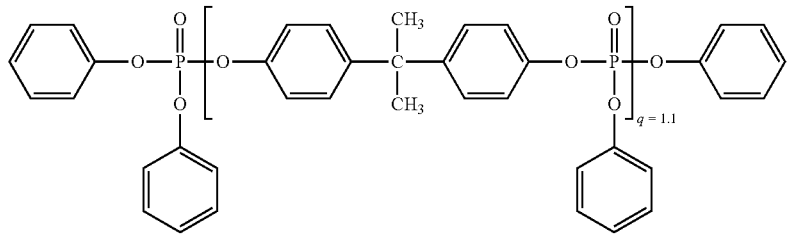

Component E

Copolymer of 77 wt. % of styrene and 23 wt. % of acrylonitrile having a weight-average molecular weight $M_w$ of 130 kg/mol (determined by GPC), prepared by the bulk process.

Component F

Component F-1: CFP 6000 N, polytetrafluoroethylene powder (manufacturer: Du Pont, Geneva, Switzerland)
Component F-2: Pentaerythritol tetrastearate
Component F-3: Irganox® B900 (manufacturer: Ciba Specialty Chemicals Inc., Basle, Switzerland)

Preparation and Testing of the Moulding Compositions

The starting substances listed in Tables 1-5 are compounded and granulated on a twin-screw extruder (ZSK-25) (Werner and Pfleiderer) at a speed of rotation of 225 rpm and a throughput of 20 kg/h at a machine temperature of 260° C.

The finished granules are processed on an injection moulding machine to give the corresponding test specimens (melt temperature 260° C., mould temperature 80° C., melt front speed 240 mm/s). Characterization is carried out in accordance with DIN EN ISO 527 (elongation at break determined in a tensile test), UL 94 V (measured on bars of dimensions 127×12.7×1.0 mm) and ISO 11443 (melt viscosity).

The environmental stress cracking (ESC) test (ISO 4599) carried out as follows serves as a measure of the resistance of the compositions prepared to chemicals:

With toluene:isopropanol in a vol. ratio of 60:40 as the test medium (ISO 4599), exposure at an edge fibre elongation of 2.4%, i.e. the period of time is determined and that at which fracture of the test specimen occurs is stated.

The change in the MVR measured in accordance with ISO 1133 at 240° C. with a plunger load of 5 kg after storage of the granules at 95° C. and 100% relative atmospheric humidity (FWL storage) for 7 days serves as a measure of the resistance of the compositions prepared to hydrolysis. In this context, the increase in the MVR value compared with the MVR value before the corresponding storage is calculated as ΔMVR (hydr.), which is defined by the following formula.

$$\Delta MVR(hydr.) = \frac{MVR(afterFWLstorage) - MVR(beforestorage)}{MVR(beforestorage)} \cdot 100\%$$

It can be seen from Table 1 that the compositions according to the disclosure of Examples 5, 7 and 9 have a higher stability to hydrolysis, a higher resistance to chemicals (the time to fracture in the ESC test is in each case longer than 30 minutes) and a lower melt viscosity compared with the compositions of the comparison examples.

Table 1: Compositions and Their Properties

All documents referred to herein are specifically incorporated herein by reference in their entireties.

As used herein and in the following claims, articles such as "the", "a" and "an" can connote the singular or plural.

The invention claimed is:

1. A composition consisting essentially of
   A) 40 to 99 parts by wt., in each case based on the sum of the parts by weight of components A+B+C+D, of aromatic polycarbonate and/or aromatic polyester carbonate,
   B) 0.5 to 20 parts by wt., in each case based on the sum of the parts by weight of components A+B+C+D, of graft polymer, consisting of
      B.1 5 to 95 wt. % of one or more vinyl monomers on
      B.2 95 to 5 wt. % of one or more silicone/acrylate composite rubbers as the graft base, wherein the silicone/acrylate rubber comprises
         B.2.1 65-95 wt. % of silicone rubber and
         B.2.2 35 to 5 wt. % of polyalkyl(meth)acrylate rubber,
      wherein the two rubber components B.2.1 and B.2.2 mentioned are mutually penetrating in the composite rubber, wherein B.2.1 and B.2.2 cannot be separated substantially from one another,
   C) 0.1 to 20 parts by wt., in each case based on the sum of the parts by weight of components A+B+C+D, of graft polymer, consisting of
      C.1 5 to 95 wt. % of at least one vinyl monomer on
      C.2 95 to 5 wt. % of at least one graft base containing diene rubber, and the graft polymer has a core-shell structure prepared in the emulsion polymerization process, which has a graft base C.2 with an average particle size ($d_{50}$ value) of from 0.15 to 0.4 μm, and
   D) 0.4 to 20 parts by wt., in each case based on the sum of the parts by weight of components A+B+C+D, of at least one flameproofing agent selected from the group consisting of mono- and oligomeric phosphoric and phosphonic acid esters, phosphonatamines and phosphazenes.

2. A composition according to claim 1, wherein at least one of the vinyl monomers B.1 is selected from the group con-

| | | 1 (comp.) | 2 (comp.) | 3 (comp.) | 4 (comp.) | 5 | 6 (comp.) | 7 | 8 (comp.) | 9 | 10 (comp.) |
|---|---|---|---|---|---|---|---|---|---|---|---|
| Components (parts by wt.) | | | | | | | | | | | |
| A | | 86.4 | 86.4 | 86.0 | 86.0 | 77.3 | 77.3 | 77.3 | 77.3 | 75.3 | 75.3 |
| B-1 | | 5.0 | | 5.2 | | 7.6 | | 5.05 | | 6.05 | |
| B-2 | | | 5.0 | | 5.2 | | 7.6 | | 5.05 | | 6.05 |
| C-1 | | | | | | | | | | 6.05 | 6.05 |
| C-2 | | | | | | 2.5 | 2.5 | 5.05 | 5.05 | | |
| D | | 8.6 | 8.6 | 8.8 | 8.8 | 12.6 | 12.6 | 12.6 | 12.6 | 12.6 | 12.6 |
| E | | | | | 2.6 | 2.6 | | | | | |
| F-1 | | 0.4 | 0.4 | 0.4 | 0.4 | 0.4 | 0.4 | 0.4 | 0.4 | 0.4 | 0.4 |
| F-2 | | 0.4 | 0.4 | 0.4 | 0.4 | 0.4 | 0.4 | 0.4 | 0.4 | 0.4 | 0.4 |
| F-3 | | 0.1 | 0.1 | 0.1 | 0.1 | 0.1 | 0.1 | 0.1 | 0.1 | 0.1 | 0.1 |
| Properties | | | | | | | | | | | |
| ESC test (toluene:isopropanol) time to fracture | h:min | 09:10 | 01:28 | 16:08 | 02:08 | >30:00 | 24:45 | >30:00 | 12:05 | >30:00 | 16:43 |
| Melt viscosity 260° C. [1,000 s$^{-1}$] | Pa-s | 381 | 387 | 318 | 341 | 260 | 286 | 262 | 284 | 219 | 237 |
| UL 94 V at 1.0 mm thickness, total after-burn time | sec | 17 | 33 | 22 | 27 | 25 | 31 | 27 | 34 | 37 | 63 |
| Elongation at break | % | 109 | 106 | 111 | 108 | 107 | 98 | 103 | 100 | 104 | 99 |
| ΔMVR (hydr.) | % | 44 | >100 | 48 | >100 | 15 | 55 | 16 | 35 | 70 | >100 |

Additional advantages, features and modifications will readily occur to those skilled in the art. Therefore, the disclosure in its broader aspects is not limited to the specific details, and representative devices, shown and described herein. Accordingly, various modifications may be made without departing from the spirit or scope of the general concept as defined by the appended claims and their equivalents.

sisting of styrene, α-methylstyrene, methyl methacrylate, n-butyl acrylate and acrylonitrile.

3. A composition according to claim 1, comprising as component C a graft polymer of
C.1 5 to 95 wt. % of at least one vinyl monomer,
wherein the vinyl monomer comprises
C.1.1. 50 to 99 parts by wt., based on the sum of C.1.1 and C.1.2, equal to 100 parts by wt., of vinylaromatics and/or vinylaromatics substituted on the nucleus and/or (meth)acrylic acid ($C_1$-$C_8$)-alkyl esters, and
C.1.2 1 to 50 parts by wt., based on the sum of C.1.1 and C.1.2, equal to 100 parts by wt., of vinyl cyanides and/or (meth)acrylic acid ($C_1$-$C_8$)-alkyl esters, and/or derivatives of unsaturated carboxylic acids,
on
C.2 95 to 5 wt. % of at least one graft base containing diene rubber.

4. A composition according to claim 3, wherein:
the vinylaromatics are styrene, α-methylstyrene, p-methylstyrene or p-chlorostyrene,
the (meth)acrylic acid ($C_1$-$C_8$)-alkyl esters are methyl methacrylate, ethyl methacrylate, n-butyl acrylate, or t-butyl acrylate,
the vinyl cyanides are unsaturated nitriles, and
the derivatives of unsaturated carboxylic acids are maleic anhydride or N-phenyl maleimide.

5. A composition according to claim 3, wherein the graft base C.2 is at least one diene rubber selected from the group consisting of butadiene rubber, isoprene rubber, copolymers of diene rubbers, copolymers of butadiene rubber and further copolymerizable monomers chosen from C.1.1 and C.1.2, copolymers of isoprene rubber, and further copolymerizable monomers chosen from C.1.1 and C.1.2.

6. A composition according to claim 3, comprising as component C a graft polymer with a core-shell structure prepared in the bulk, solution or bulk-suspension polymerization process, which has a rubber content of component C.2 in the graft polymer C from 16 to 25 wt. %, and a grafted shell which comprises, in each case based on the monomers of the grafted shell, 22 to 27 wt. % of at least one of the monomers according to C.1.2 and 73 to 78 wt. % of at least one of the monomers according to C.1.1.

7. A composition according to claim 1, comprising as component D mono- and oligomeric phosphoric or phosphonic acid esters of formula (VIII)

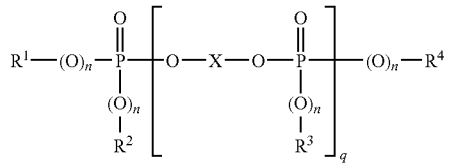

(VIII)

wherein
$R^1$, $R^2$, $R^3$ and $R^4$ independently of one another denote in each case optionally halogenated $C_1$ to $C_8$-alkyl, or $C_5$ to $C_6$-cycloalkyl, $C_6$ to $C_{20}$-aryl or $C_7$ to $C_{12}$-aralkyl in each case optionally substituted by alkyl and/or halogen,
n independently of one another denotes 0 or 1,
q denotes 0 to 30 and
X denotes a mono- or polynuclear aromatic radical having 6 to 30 C atoms, or a linear or branched aliphatic radical having 2 to 30 C atoms, which can be substituted by OH and can contain up to 8 ether bonds.

8. A composition according to claim 7, wherein
$R^1$, $R^2$, $R^3$ and $R^4$ represent cresyl, phenyl, xylenyl, propylphenyl or butylphenyl,
n is 1,
q represents values from 0.5 to 6 and
X is derived from resorcinol, hydroquinone, bisphenol A or diphenylphenol.

9. A composition according to claim 1, comprising as component D, bisphenol A-based oligophosphate according to formula (VIIIa)

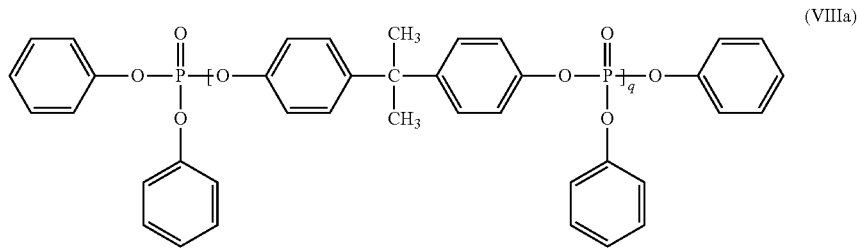

(VIIIa)

wherein q in formula (VIIIa) represents values from 1.05 to 1.2.

10. A composition according to claim 1, comprising 0 to 20 parts by wt., based on the sum of the parts by weight of components A+B+C+D, of at least one polymer selected from the group consisting of rubber-free vinyl(co)polymer and polyalkylene terephthalate.

11. A composition according to claim 10, wherein said at least one polymer selected from the group consisting of rubber-free vinyl(co)polymer and polyalkylene terephthalate is present.

12. A composition according to claim 1, comprising 0 to 50 parts by wt., in each case based on the sum of the parts by weight of components A+B+C+D, of at least one additive selected from the group consisting of flameproofing synergists, antidripping agents, lubricants and mould release agents, nucleating agents, stabilizers, antistatics, acids, fillers, reinforcing substances, dyestuffs and pigments.

13. A method for making a shaped article comprising using a composition of claim 1.

14. A shaped article comprising a composition according to claim 1.

15. A shaped article according to claim 14, wherein the shaped article is a part of a motor vehicle, rail vehicle, aircraft or aquatic vehicle, a film, a profile or a housing component of any type.

16. A composition consisting of
A) 40 to 99 parts by wt., in each case based on the sum of the parts by weight of components A+B+C+D, of aromatic polycarbonate and/or aromatic polyester carbonate,
B) 0.5 to 20 parts by wt., in each case based on the sum of the parts by weight of components A+B+C+D, of graft polymer, wherein the graft base is a silicone/acrylate composite rubber of mutually penetrating silicone rubber and polyalkyl(meth)acrylate rubber, wherein the content of silicone rubber is 65-95 wt. %, based on the graft base, and the content of polyalkyl(meth)acrylate rubber is 35 to 5 wt. %, based on the graft base C) 0.1 to 20 parts by wt., in each case based on the sum of the parts by weight of components A+B+C+D, of graft polymer, wherein the graft base is a diene rubber, and D) 0.4 to 20 parts by wt., in each case based on the sum of the parts by weight of components A+B+C+D, of at least one flameproofing agent selected from the group consisting of mono- and oligomeric phosphoric and phosphonic acid esters, phosphonatamines and phosphazenes, E) 0 to 20 parts by wt., based on the sum of the parts by weight of components A+B+C+D, of at least one polymer selected from the group consisting of rubber-free vinyl(co)polymer and polyalkylene terephthalate, and F) 0 to 50 parts by wt., in each case based on the sum of the parts by weight of components A+B+C+D, of at least one additive selected from the group consisting of flameproofing synergists, antidripping agents, lubricants and mould release agents, nucleating agents, stabilizers, antistatics, acids, fillers, reinforcing substances, dyestuffs and pigments.

17. A composition consisting of

A) 40 to 99 parts by wt., in each case based on the sum of the parts by weight of components A+B+C+D, of aromatic polycarbonate and/or aromatic polyester carbonate, B) 0.5 to 20 parts by wt., in each case based on the sum of the parts by weight of components A+B+C+D, of graft polymer, wherein the graft base is a silicone/acrylate composite rubber of mutually penetrating silicone rubber and polyalkyl(meth)acrylate rubber, wherein the content of silicone rubber is 65-95 wt. %, based on the graft base, and the content of polyalkyl(meth)acrylate rubber is 35 to 5 wt. %, based on the graft base C) 0.1 to 20 parts by wt., in each case based on the sum of the parts by weight of components A+B+C+D, of graft polymer, consisting of
  C.1 5 to 95 wt. % of at least one vinyl monomer on
  C.2 95 to 5 wt. % of at least one graft base containing diene rubber,
and the graft polymer has a core-shell structure prepared in the emulsion polymerization process, which has a graft base C.2 with an average particle size ($d_{50}$ value) of from 0.15 to 0.4 μm, D) 0.4 to 20 parts by wt., in each case based on the sum of the parts by weight of components A+B+C+D, of at least one flameproofing agent selected from the group consisting of mono- and oligomeric phosphoric and phosphonic acid esters, phosphonatamines and phosphazenes, E) 0 to 20 parts by wt., based on the sum of the parts by weight of components A+B+C+D, of at least one polymer selected from the group consisting of rubber-free vinyl(co)polymer and polyalkylene terephthalate, and F) 0 to 50 parts by wt., in each case based on the sum of the parts by weight of components A+B+C+D, of at least one additive selected from the group consisting of flameproofing synergists, antidripping agents, lubricants and mould release agents, nucleating agents, stabilizers, antistatics, acids, fillers, reinforcing substances, dyestuffs and pigments.

\* \* \* \* \*